Patented Aug. 21, 1928.

1,681,727

UNITED STATES PATENT OFFICE.

FREDERIC M. EMERSON, OF BOSTON, MASSACHUSETTS, ASSIGNOR TO EMERSON & NORRIS COMPANY, OF BOSTON, MASSACHUSETTS, A CORPORATION OF MASSACHUSETTS.

ARTIFICIAL CAST STONE AND PROCESS OF PRODUCING THE SAME.

Application filed August 10, 1927. Serial No. 212,048.

This invention relates to artificial cast stone and a process for producing the same, and has for its object the production of a precast stone containing hydraulic cement presenting at one or more of its revealed faces an artistically textured surface, whereby it may be utilized for structural and ornamental purposes and for securing architectural and artistic effects for exteriors and interiors of buildings.

The revealed cast surface of a body of stone produced by the hereinafter described process may vary from a fine to a coarse variegated texture, the surface of which is characterized throughout by depressions, furrows, pits and interstices of widely varying size, form and depth, presenting both rounded and sharply angular corners and ridges and affording a surface texture artistic in appearance and novel in its formation. If desired, also, the surface may be made to present not only a variegated texture but to combine with this a variegated and clouded or blended color tone effect, so that there may be produced a wide range of cast stone surfaces resembling the natural and even weathered surfaces of a wide variety of natural stones which have heretofore been incapable of being reproduced by the casting or molding process.

Precast cement stones for building purposes as heretofore manufactured have been principally formed with the aid of sand molds employing a relatively dry, absorbent sand, one effect of which is to absorb through the contacting surface of the mold the surplus water from the concrete which is poured into it. This drainage of the water carries with it the laitance from the cement contained in the concrete and, as the water is absorbed by the mold sand, the latter filters or screens out the cement producing a thin layer of neat cement on the face of the cast stone, which thin skin in turn has adhering to it more or less sand picked up by it from the surface of the sand mold. This hard cement skin tends in the course of time to craze or check, causing fine hair cracks on the surface, so that it is desirable to remove it by some process after the stone has been removed from the mold.

The ordinary sand-mold process has also produced a uniform and monotonous surface in respect to both texture and color which is undesirable for many types of architecture due to the fact that concrete of the same uniform mixture is usually poured into a series of sand molds having the same character of surface.

Attempts to produce color tones distinct from the grays and whites of Portland cement have usually been made by either mixing coloring matter with the cement, which in turn is mixed with the sand and aggregates or by using selected aggregates of the desired color. In the first case, even shades exist through the whole surface of the stone and the coloration is more or less limited, as otherwise too much color with the cement would tend to produce structural weakness in the stone. In the second case, the surface of the stone must be removed in some manner after it has been removed from the mold in order to reveal the colored aggregates.

In carrying out my improved process, a surface of a mold, preferably, though not necessarily, composed of sand, which surface corresponds to a revealed face of the piece to be cast, is so treated as to provide a roughened and preferably more or less granulated and more or less non-absorbent surface which may, if desired, present in relief irregularly disposed elevations varying in form, size and arrangement. With the mold prepared in this manner, the drainage and consequently the formation of the skin of cement referred to are substantially eliminated, so that, when the piece is removed from the mold and the loose sand brushed from the surface, the cast face of the piece, without further operation thereon, presents a granular surface texture which may have irregularly distributed depressions varying in depth, size and shape, providing an artistic fine or coarse textured surface. A non-absorbent condition of the mold in the case of a sand mold is preferably obtained by fluid treating the surface of the mold to render the same water-resisting, and the character of the texture obtained may be controlled by the manner in which the distribution of the waterproofing or water-resisting material is effected.

If it is desired to combine a textured surface with a variegated color effect, before filling the mold with the concrete there may be applied to the prepared surface of the mold a relatively small amount of a wet mixture containing coloring material and cement, or cement and aggregates, which, if desired, may be applied in irregular patches or masses, or may be veined or blended into the stone-producing mixture as or before the latter is poured into the mold. When the stone-producing cementitious compound is thereafter poured into the mold the surface coloring previously applied tends to be carried more or less irregularly over the water-resisting surface of the mold, producing a blending of the colored and uncolored mixtures in variegated and irregular designs which are united in a perfect chemical bond with the stone. If a plurality of different colored mixtures are thus applied, or if the stone producing compound is itself differently colored, the several colors tend to blend or to cloud together, producing variegated color effects which may differ widely in different stones produced, and which with the variegated texture may produce surface appearance incapable of being produced by any other process heretofore known. The range of both the texture and color tone may cover an infinite variety of combinations and effects since, by the preferred form of the process, it is impossible for the operator to produce two stones exactly alike either in texture or degree of color or location of color.

The invention will be best understood by reference to the following description when taken in connection with the accompanying illustration of one specific embodiment thereof, while its scope will be more particularly pointed out in the appended claims.

In the drawings:

Figs. 1, 2, 3 and 4 represent, in so far as can be done with black line drawings, portions of the revealed faces of different stones cast by the herein described process and exhibiting various types of surface texture which may be secured thereby.

As an illustrative example of my improved method of producing a textured surface, the following may be instanced.

A mold is first prepared in the usual manner employing ordinary molding sand in a just sufficiently dampened condition to hold its form when pressed into the desired shape, the inner exposed surface or surfaces of the mold corresponding to the revealed face of the piece to be cast being left either plain or having impressed therein the design or pattern which it is desired to be borne by the revealed surface.

The surface of one or more of the faces of the mold is then fluid-treated to render it more or less non-absorbent by spraying or spattering thereon a waterproofing or water-resisting substance in fluid or semi-fluid form. For this purpose a fluid may be used embodying a water-resisting solid material, such as wax, carried in suspension or partial suspension in the fluid, and the irregular accumulations of such solid substances on the face of the mold may be relied on in whole or in part to produce in relief on the mold surface elevations calculated to provide the depressions in the cast surface which aid in producing the textural effect.

For such fluid substance I may, for example, employ paraffin wax carried in suspension in some petroleum distillate such as kerosene, with or without paraffin oil. A suitable fluid substance may be had by mixing melted paraffin wax with an equal bulk of kerosene. The paraffin is held in suspension in more or less finely divided form according to the temperature at which the fluid is maintained. This may vary from almost complete fluidity at higher temperatures to a more or less coagulated state where the temperature is lower than in which the paraffin appears in more or less coagulated masses, particles or flakes. At an ordinary room temperature of 70° Fah. this fluid may be spattered on the mold surface, causing the excess oil to partly strike into the sand and leaving irregular accumulations of the oil-covered paraffin in the form of detached flakes, masses or particles of various sizes and heights and of various intricate and irregular shapes varying from more or less convex nodules to jagged points or spurs and presenting both rounded and sharply angular corners and ridges. Fluid substances suitable for the described treatment of the mold containing paraffin in suspension in an oily liquid may be purchased on the market, such as those sold under the name of "Minwax" or "Co-wa-co". Paraffin or other waxy substances may also be employed dispersed in a fluid carrier comprised in whole or in part of a volatile liquid which will wholly or partly evaporate from the surface of the mold after it has been applied thereto.

If a wide variation of texture is desired for the surface of the cast piece, the surface may be treated by spattering the fluid from a stiff brush, such as a whisk broom, the latter having first been dipped into the fluid. By this method there may not only be produced a markedly irregular and variegated texture, but, since the mold-surface, relief pattern produced by this means will necessarily differ for each successive stone produced, it will follow that no two stones will be duplicates of each other in this respect. A rougher texture may be produced by a second or a second and third application of the fluid by the brush-spattering operation, care being taken, however that sufficient time elapses before each application to allow the fluid from the previous application to be drained from the wax, leaving the latter in relatively firm and more or less coagulated form.

If a less irregular surface is desired, with the pitting or interstices less pronounced, the fluid may be sprayed on the surface by an air brush or other spraying device. By applying the fluid at a relatively low temperature or by applying a relatively large amount to the surface of the mold, the accumulations of paraffin will be more pronounced in size and height and the resultant texture of the cast surface more deeply pitted and furrowed. The higher the percentage of paraffin employed in the fluid, the greater becomes the amount of its solidification at lower temperatures. By first heating the fluid and applying it at a relatively higher temperature or by making a relatively light application thereof, the accumulations will be less pronounced in height and size and the resultant texture of the cast surface will be less deeply pitted and furrowed. By applying it in more fluid form, as by preheating it, and in larger amounts the corners and ridges of the accumulations may be given a relatively more rounded and relatively less sharply angular form.

The kind of texture, therefore, may be readily governed by the manner of distribution of this waterproofing material over the mold surface. The described treatment leaves a substantially water-resisting surface which presents in relief irregularly disposed elevations ranging in size and form from those particles of sand of which the mold is composed to those of the particles of paraffin wax which are distributed over its surface.

As an assistance in producing the textured relief pattern of the mold surface, particularly where a rough texture is desired, characterized by relatively deep pits or depressions interspersed and contrasting with pits or depressions of slight depth, the mold surface, before being fluid treated, may be irregularly roughened by scattering over it granular particles or pieces varying in size and shape, such as particles and lumps of loose sand and fragments of stones, so that they lie in irregular disposition thereon. The granular relief pattern thus produced is then fluid treated as above described with either a thin, light solution of the water-resisting fluid or with a solution in which the paraffin is more or less coagulated to provide additional projections in relief. When the stone is finally removed from the mold, any of such loose granular material as adheres to the face thereof may be readily separated by brushing the stone surface, since the described fluid treatment prevents any cementitious union thereof with the surface of the stone.

Again, the effect of a rough texture may be heightened in certain instances by so treating the mold surface as to leave small separated spots thereon free from water-proofing treatment, thereby providing occasional absorbent small spots or patches in the otherwise generally non-absorbent mold surface. When the cast stone is finally removed from the mold prepared in this manner, the revealed face of the stone where it corresponds to such non-absorbent spots will carry with it small accumulations or particles of loose sand more or less firmly and cementitiously united to the stone piece, giving a mottled effect to the texture which is heightened by the contrast between the more porous character of the occasional small sand spots contrasted with the firmer and less porous character of the adjacent textured surface.

The mold having been prepared in the above described manner, it is allowed to stand for a short time to permit the volatile content, if any, of the fluid to evaporate and the surplus oil to strike into the sand surface.

To cast the textured surface, the stone compound comprising the cement mixed with water and aggregates may be poured in to fill the mold or, before the main body of the stone is cast, the surface may first be covered with a cement grout, or a cement grout with intermingled aggregate, prepared with a sufficient admixture of water to make it flow readily over the molded surface. In the latter case, I have found that a mixture of one part by bulk of cement with two to three parts of sand and one part by bulk of water may be used with good results, although these proportions may be widely varied. This grout may have more or less coloring material mixed with it to provide an even prevailing color tone for the textured surface of the cast piece, or it may be used without color and the natural color of the cement relied upon to provide such prevailing color tone. A grout of this description is poured into the mold so as to entirely cover the prepared surface thereof, after which the concrete or other stone producing compound employed is poured in to fill the mold. In applying the surface grout or mixture, a sufficient amount is used to cover all projections in relief presented by the mold surface. The depth of such surface covering will vary with the character of the surface, but ordinarily a depth of one-eighth to one-fourth of an inch will suffice. From the nature of the water-resisting ground on which the initial or surface charge of grout is placed its physical condition remains unchanged without the abstraction of water therefrom by the sand of the mold, so that, when the mold is subsequently filled with concrete or other stone forming compound, it forms a perfect bond with the mass of the stone.

The fluid treatment of the mold and the application of the surface grout as above described can be successfully employed in connection with a vertical or other non-horizontal face of the mold. The water-resisting material will adhere equally well to a vertical face, and in applying the surface grout or mixture to a treated vertical or non-horizontal face of the mold a mixture should be preferably used somewhat less fluid in consistency than for a horizontal face. In case it is desired to employ sand or other granular particles to roughen the texture of a vertical or non-horizontal mold face, the sand particles may be made to adhere by first fluid treating such mold face, and then applying the sand particles which will adhere to the waxy coating. The entire face, including the sand particles thus applied, is then fluid treated as previously described.

If a variegated color tone is desired, before pouring the initial charge of grout into the mold, there is applied to the prepared mold surface a colored, cement grout of some color or shade which it is desired to blend or contrast with the prevailing color tone of the revealed face. Such contrasting colored cement grout may be applied in the form of detached, irregular patches or masses, and is preferably formed by mixing cement alone with the desired coloring material and an admixture of water sufficient to make it fluid. A stiff brush, such as a whisk broom, dipped in the colored cement grout may be used to spatter the colored mixture over the prepared face of the mold in irregular patches or spots.

The grout as above described, presenting either the natural color of the cement or the prevailing color tone of the revealed face, is then poured into the mold over the contrasting colored patches and, flowing over the surface in and around such patches, spreads the latter out more or less over the mold face. As this takes place, the water repellant character of the surface aids in causing a ready flow of the color patches, which as they mingle with the grout provide a pleasing color distribution of the contrasting colors over the mold surface, and, in the finally completed stone, appear in the form of delicately blended streaks, veins and areas of contrasting colors, providing an effect not obtainable, so far as I am aware, except through the use of a treated mold surface. If desired the color or colors may be blended or veined into the fluid mass of the surface grout before the latter is poured into the mold or may be blended or veined into the grout after the latter has been poured into the mold, or it may be both spattered over the face of the mold and additionally veined into the grout or stone mixture after or before being poured into the mold and a clouded, variegated surface effect thereby secured.

The prepared surface or surfaces of the mold corresponding to the revealed faces of the stone having been covered with the fluid grout as described, either with or without the previous application of the contrasting, colored cement grout, or with or without the veining or blending of the color in the fluid surface grout itself, then, before the grout has been allowed to set, the mold is filled with the stone-forming compound relied upon to form the body of the stone. This may be of any of the usual mixtures consisting either of cement and sand alone or cement, sand and aggregates, the constituents of the main body of the stone piece forming no essential part of my invention.

If desired, the surface body and the main body of the stone may be cast in one operation by pouring into the mold at the outset the stone forming compound, the color texture being imparted to the revealed face or faces of the stone by veining or blending the color mixture into the fluid mass at or near such revealed faces as the stone forming mixture is poured into the mold so as to produce the desired colored, clouded effect thereat. The color mixture may also be streaked into the fluid mass by the aid of a brush or other suitable implement as the mass is rolling toward the surface of the mold, the streaked deposit of colored mixture rolling integrally with the fluid mass, and becoming intermixed therewith, taking on and providing the true veined forms of colored veining as found in natural sedimentary stones.

After the mold has been filled, the cast stone is then allowed to harden for the usually required period of time. When removed from the mold, the textured surface, which has been in contact with the prepared surface of the mold and which is integrally united to the body of the cast piece by the action of the cement, may be revealed by merely brushing off the loose sand.

A certain amount of the paraffin wax tends to adhere to the face of the stone, forming a thin glaze over portions of the surface. This may be removed by washing the textured stone surface with a solvent of paraffin, such as naphtha, or it may be allowed to remain, producing a waterproof surface which is advantageous in preventing too quick a drying of the face of the stone during the early stages of its seasoning.

While certain advantages of this process may be had in connection with the use of other than sand molds and my invention is not limited thereto, it is particularly advantageous in connection with molds prepared from sand, by the aid of which certain kinds of textured surfaces can be produced to the best advantage. The described fluid treatment of the wall of a sand mold appears to create a slight disturbance and separation of the individual surface granules of sand, so that the latter, as they are coated with the oil and wax, tend to supply an irregular, granular, water-resisting, mold background for those small areas of the mold face which lie intermediate the other irregularities and elevations thereon, supplying a texture effect for the stone which is peculiar to the use of sand as a molding medium.

The cast stone produced by this process will present an ornamental cast face having a variegated surface texture characterized throughout by irregularly distributed depressions varying in depth, size and shape, presenting both rounded and sharply angular corners and ridges and to a substantial extent reentrant formations and undercut surfaces. Such depressions are wholly in the surface, the main body of the stone being solid and substantially non-porous. Where the contrasting colors have been employed as described, the latter will be blended in cloud effects giving a combination of variegated texture and variegated color which, so far as I am aware, have not been capable of being produced by any of the processes heretofore known.

The described form of artificial stone consists of a surface body backed by and integrally united to the main body of the stone, the surface body presenting a consistently irregular surface. Due to the innumerable interstices, pits and depressions widely varying in depth, size and shape, with contours varying in degree of sharp angularity and roundness and irregularly arranged and distributed, the surface will appear more or less roughened and weathered and with a more or less granular aspect when viewed from a short distance away. The background of the surface, however, or that which underlies and surrounds such interstices, pits and depressions where the surface mixture has come in contact with the paraffined walls of the sand mold will present numerous, smooth, wax-impressed areas and will be found on close examination actually to be impervious and extremely smooth, even after any remnant paraffin has been removed, so that the stone thereby produced yields in numerous small areas a quality of polish or reflection which materially adds to its textural effect, while, at the same time, is extremely durable, and, when used for exterior work, is well adapted to withstand the action of the weather.

While the textural effect presented by the stone can only be imperfectly represented by black-line drawings, so far as it can be thereby shown, there is represented in the accompanying drawings for illustrative purposes a portion of each of the revealed faces of four different pieces of stone cast by this process which exemplify variations in surface texture capable of being produced by the same.

In Fig. 1 a relatively roughened, deeply pitted texture is shown, the depressions $a$ and $b$ being produced by relatively large granular accumulations applied to the face of the mold, subsequently fluid treated to cover them with the paraffin as described. Other major depressions, such as $c$, are due to smaller granular particles applied to the mold, while the texture of the major part of the surface, including such rounded depressions as $d$ and more sharply angular depressions as $e$, and the general intermediate irregularities of the surface, is produced by the effect of the accumulations of paraffin wax.

In Fig. 2 a somewhat less pronounced pitting is had by the application of granular material of lesser mass on the surface of the mold and a somewhat less irregular application of the paraffin.

In Fig. 3 the surface texture, while still presenting the characteristic irregularity of sharply angular and rounded depressions and yielding a strikingly artistic texture effect, reveals such pits and depressions relatively less pronounced in form.

In Fig. 4 the fluid treatment of the mold has been such as to leave the pits and depressions still less pronounced.

While I have herein described in detail one particular manner of carrying out my process, it is to be understood that the invention is not limited to the precise steps herein described, either in respect to the manipulation employed or the materials, ingredients or proportions set forth.

I claim:

1. The process of casting artificial stone to produce a revealed, textured surface which consists in preparing a sand mold, roughening a surface thereof corresponding to a revealed face of the piece to be cast by applying thereto irregularly arranged granular particles to produce a mold surface presenting irregularly arranged elevations, fluid treating said mold surface by spattering or spraying thereon masses of paraffin commingled with an oily fluid, and introducing into the mold a wet, stone-producing compound containing hydraulic cement.

2. The process of casting artificial stone to produce a revealed, textured surface which consists in providing a mold, roughening a surface thereof corresponding to a revealed face of the piece to be cast by applying thereto irregularly arranged, granular particles to produce a mold surface presenting irregularly arranged elevations, fluid treating said mold surface by spattering or spraying thereon masses of paraffin commingled with an oily fluid, and introducing into the mold a wet, stone-producing compound containing hydraulic cement.

3. The process of casting artificial stone which consists in providing a mold, roughening a surface thereof corresponding to a revealed face of the piece to be cast by spattering or spraying thereon masses of paraffin commingled with an oily fluid, and introducing into the mold a wet, stone-producing compound containing hydraulic cement.

4. The process of casting artificial stone to produce a revealed, textured surface which consists in providing a mold, roughening a surface thereof corresponding to a revealed face of the piece to be cast by applying thereto a water-resisting fluid embodying a wax and producing, by the irregular accumulations of the wax, mold areas presenting irregularly arranged elevations, and introducing into the mold a wet, stone-producing compound containing hydraulic cement.

5. The process of casting artificial stone to produce a revealed, textured surface which consists in providing a mold, roughening a surface thereof corresponding to a revealed face of the piece to be cast by applying thereto a water-resisting fluid carrying a solid substance and thereby providing mold areas presenting irregularly arranged elevations, and introducing into the mold a wet, stone-producing compound containing hydraulic cement.

6. The process of casting artificial stone to produce a revealed, textured surface which consists in preparing a sand mold, applying to a surface thereof irregularly arranged granular particles to produce a mold surface presenting irregularly arranged elevations, fluid-treating said mold surface by applying thereto a water-resisting fluid embodying a waxy substance, and introducing into the mold a wet, stone-producing compound containing hydraulic cement.

7. The process of casting artificial stone which consists in providing a sand mold, roughening a surface thereof corresponding to a revealed face of the piece to be cast by spattering or spraying thereon masses of paraffin commingled with an oily fluid, and introducing into the sand mold a wet, stone-producing compound containing hydraulic cement.

8. The process of casting artificial stone to produce a revealed, textured surface which consists in preparing a sand mold, fluid-treating a surface thereof corresponding to a revealed face of the piece to be cast by applying thereto irregular accumulations of a water-resisting fluid embodying a waxy substance and thereby providing a mold area presenting irregularly arranged elevations, and introducing into the mold a wet, stone-producing compound containing hydraulic cement.

9. The process of casting artificial stone to produce a revealed, textured surface which consists in providing a mold, roughening a surface thereof corresponding to a revealed face of the piece to be cast by applying thereto irregularly arranged granular particles, applying thereto a water-resisting fluid embodying wax, and introducing into the mold a wet, stone-producing compound containing hydraulic cement.

10. The process of casting artificial stone to produce a revealed, textured surface which consists in providing a mold, roughening a surface thereof corresponding to a revealed face of the piece to be cast by applying thereto irregularly arranged, granular particles to produce a mold surface presenting irregularly arranged elevations, fluid-treating said mold surface by applying thereto a water-resisting fluid, introducing into the mold a wet, stone-producing compound containing cement, and veining or blending into the said compound within the mold and adjacent such fluid-treated wall a colored cement-mixture.

11. The process of casting artificial stone to produce a revealed, textured surface which consists in preparing a sand mold, wax-treating a surface thereof to provide an irregular surface, and introducing into the mold a wet, stone-producing compound containing hydraulic cement.

12. The process of casting artificial stone to produce a revealed, textured surface which consists in preparing a sand mold, applying to a surface thereof a water-resisting fluid carrying a solid substance and thereby providing mold areas presenting irregularly arranged elevations and other areas uncovered by said fluid, and introducing into the mold a wet, stone-producing compound containing hydraulic cement.

13. The process of casting artificial stone to produce a revealed textured surface which consists in preparing a sand mold, applying to a surface thereof particles to produce in relief irregularly arranged elevations, and applying to said surface a water-resisting coating by spattering the same thereon.

14. The process of casting artificial stone to produce a revealed textured surface which consists in preparing a mold, spattering against a surface thereof a water-resisting substance and producing irregularly arranged elevations, and introducing into the mold a wet stone producing compound containing cement.

15. The process of casting artificial stone to produce a revealed textured surface which consists in preparing a sand mold, applying to a face thereof particles of varying shapes and sizes, spattering on said face a water-resisting substance to produce a closely adhering film of varying configuration and thickness, and introducing into the mold a wet stone producing cementitious compound.

16. The process of casting artificial stone to produce a revealed textured surface which consists in preparing a sand mold, spattering on a surface thereof a water-resisting substance to produce a closely adhering film of varying configuration and thickness, and introducing into the mold a wet stone producing cementitious compound.

17. The process of casting artificial stone to produce a revealed textured surface which consists in preparing a sand mold, applying to a surface thereof particles of varying shapes and sizes and applying to said surface a closely conforming waxy film of varying configuration and thickness, and introducing into the mold a wet stone producing cementitious compound.

18. The process of casting artificial stone to produce a revealed textured surface which consists in preparing a mold, applying to a surface thereof by spattering a water-resisting coating, then applying particles of various shapes and sizes, spattering said surface and particles with a film forming fluid to provide a water-resisting coating of varying configuration and thickness, and introducing into said mold a wet stone producing cementitious compound.

19. The process of casting artificial stone to produce a revealed textured surface which consists in preparing a mold, applying to a surface thereof a closely conforming waxy film of varying configuration and thickness, and introducing into said mold a wet stone producing cementitious compound.

20. As a new article of manufacture, an artificial stone having a revealed cast face the surface of which is the impression of an irregular, wax-bespattered mold surface.

21. As a new article of manufacture, an artificial stone having a revealed cast face the surface of which is the impression of a wax-coated, sand mold surface.

22. As a new article of manufacture, an artificial stone having a revealed cast face, the surface of which is the impression of an irregular, wax-coated, sand mold surface presenting both angular and rounded prominences of varying shapes and sizes.

23. As a new article of manufacture, an artificial stone having a revealed cast face having a surface which is the impression of a water-resisting, irregularly bespattered, sand mold surface composed of uneven areas and presenting angular and other irregularly contoured prominences of various shapes and sizes.

In testimony whereof, I have signed my name to this specification.

FREDERIC M. EMERSON.